(12) United States Patent
Gao

(10) Patent No.: US 12,500,698 B2
(45) Date of Patent: Dec. 16, 2025

(54) METHOD AND DEVICE FOR DETERMINING HARQ-ACK FEEDBACK TIME SEQUENCE

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 533 days.

(21) Appl. No.: 17/918,892

(22) PCT Filed: Apr. 13, 2021

(86) PCT No.: PCT/CN2021/086890
§ 371 (c)(1),
(2) Date: Oct. 13, 2022

(87) PCT Pub. No.: WO2021/208905
PCT Pub. Date: Oct. 21, 2021

(65) Prior Publication Data
US 2023/0336278 A1    Oct. 19, 2023

(30) Foreign Application Priority Data
Apr. 15, 2020   (CN) .......................... 202010296252.9

(51) Int. Cl.
*H04L 1/1812*   (2023.01)
*H04L 27/26*    (2006.01)
(Continued)

(52) U.S. Cl.
CPC ...... *H04L 1/1812* (2013.01); *H04L 27/26025* (2021.01); *H04W 72/1273* (2013.01); *H04W 72/232* (2023.01)

(58) Field of Classification Search
CPC .......... H04L 1/1812; H04L 27/26025; H04W 72/1273; H04W 72/232
See application file for complete search history.

(56) References Cited

U.S. PATENT DOCUMENTS

2018/0115965 A1   4/2018  Takeda et al.
2018/0368114 A1  12/2018  Chen et al.
(Continued)

FOREIGN PATENT DOCUMENTS

| CN | 107432018 A | 12/2017 |
| CN | 110754059 A | 2/2020 |
| EP | 3319259 A1 | 5/2018 |

OTHER PUBLICATIONS

International Search Report for PCT/CN2021/086890 issued on Jun. 28, 2021 and its English Translation provided by WIPO.
(Continued)

*Primary Examiner* — Derrick V Rose
(74) *Attorney, Agent, or Firm* — Ladas & Parry, LLP

(57) ABSTRACT

A method and a device for determining a HARQ-ACK feedback time sequence are provided. The method includes: receiving first DCI, where the first DCI is used for scheduling PDSCHs transmissions on a plurality of carriers; and determining a time unit for transmitting HARQ-ACKs of the PDSCHs on the plurality of carriers scheduled by the first DCI, according to a reference SCS or the PDSCH with a latest ending position among the PDSCHs on the plurality of carriers scheduled by the first DCI.

20 Claims, 10 Drawing Sheets

---

601 receiving first Downlink Control Information (DCI), where the first DCI is used for scheduling Physical Downlink Shared Channels (PDSCHs) transmissions on a plurality of carriers

602 determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI

(51) Int. Cl.
*H04W 72/1273* (2023.01)
*H04W 72/232* (2023.01)

(56) References Cited

U.S. PATENT DOCUMENTS

| | | | |
|---|---|---|---|
| 2019/0268103 A1 | 8/2019 | Park et al. | |
| 2021/0194637 A1* | 6/2021 | Lin | H04L 1/1812 |
| 2021/0314095 A1* | 10/2021 | Gao | H04L 1/1614 |
| 2021/0359796 A1* | 11/2021 | Zhang | H04L 1/1854 |
| 2022/0232541 A1* | 7/2022 | Xu | H04L 1/1854 |
| 2022/0272734 A1* | 8/2022 | Si | H04L 1/1812 |

OTHER PUBLICATIONS

Written Opinion for PCT/CN2021/086890 issued on Jun. 28, 2021 and its English Translation provided by WIPO.

International Report on Patentabily for PCT/CN2021/086890 issued on Oct. 13, 2022 and its English translation provided by WIPO.

"Discussion on scheduling and HARQ for NR-U" 3GPP TSG RAN WG1 #97 R1-1905953, Reno, USA, May 13-17, 2019, Source: ZTE, Sanechips, Agenda Item: 7.2.2.2.3.

Extended European Search Report for the corresponding European Patent Application No. 21789069.8 issued by the European Patent Office on Jul. 13, 2023.

"Remaining issues for CA with different numerologies," 3GPP TSG RAN WG1 Meeting #03, R1-1806344, Busan, Korea, May 21-25, 2018, Agenda Item: 7.1.3.4.2, Source: Lenovo, Motorola Mobility, all pages.

International Search Report for PCT/CN2021/086890 issued on Jul. 6, 2021 and its English Translation provided by WIPO.

Written Opinion for PCT/CN2021/086890 issued on Jul. 6, 2021 and its English Translation provided by WIPO.

* cited by examiner

[6023] the terminal determining a reference slot of each of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS

[6024] the terminal taking a latest reference slot in the reference slots as a first reference slot, and determining the latest time unit overlapped with the first reference slot according to the time unit defined by the SCS for transmitting the PUCCH

[6025] taking the determined time unit as a reference point of the feedback time sequence of PDSCH to HARQ-ACK, and determining the time unit for transmitting the HARQ-ACKs of the PDSCHs on the plurality of carriers scheduled by the first DCI, based on a feedback time sequence value of PDSCH to HARQ-ACK

Fig.8

[901] sending first Downlink Control Information (DCI), where the first DCI is used for scheduling Physical Downlink Shared Channels (PDSCHs) transmissions on a plurality of carriers

[902] determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI

Fig.9 based on a time unit defined by an SCS for transmitting a PUCCH, the network device determining a latest time unit overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted — 9021 the network device taking the time unit as a reference point of a feedback time sequence of PDSCH to HARQ-ACK, and determining the time unit for transmitting the HARQ-ACKs of the PDSCHs on the plurality of carriers scheduled by the first DCI, according to a feedback time sequence value of PDSCH to HARQ-ACK — 9022

Fig.10 the network device determining a reference slot of each of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS — 9023 the network device taking a latest reference slot in the reference slots as a first reference slot, and determining the latest time unit overlapped with the first reference slot according to the time unit defined by the SCS for transmitting the PUCCH — 9024 the network device taking the determined time unit as a reference point of the feedback time sequence of PDSCH to HARQ-ACK, and determining the time unit for transmitting the HARQ-ACKs of the PDSCHs on the plurality of carriers scheduled by the first DCI, based on a feedback time sequence value of PDSCH to HARQ-ACK — 9025

Fig.11

METHOD AND DEVICE FOR DETERMINING HARQ-ACK FEEDBACK TIME SEQUENCE

CROSS-REFERENCE TO RELATED APPLICATIONS

The present application is the U.S. national phase of PCT Application PCT/CN2021/086890 filed on Apr. 13, 2021, which claims a priority of Chinese patent application No. 202010296252.9 filed on Apr. 15, 2020, the disclosures of which are incorporated herein by reference in their entireties.

TECHNICAL FIELD

The present disclosure relates to the field of communication, and in particular relates to a method and a device for determining a hybrid automatic repeat request acknowledgement (HARQ-ACK) feedback time sequence.

BACKGROUND

In order to increase the scheduling efficiency and save the Downlink Control Information (DCI) overhead, a method of scheduling multiple carriers by using one DCI may need to be considered in a New Radio (NR) release 17 (Rel-17), that is, one DCI is scheduled on multiple carriers simultaneously to perform Physical Downlink Shared Channel (PDSCH) transmission. Considering that multiple carriers may have different baseband parameters (numerology, such as Sub-Carrier Spacing (SCS), etc.), when the same feedback time sequence (i.e. K1) value notified in DCI is used to determine the slot or Sub-slot for transmitting its HARQ-ACK, the PDSCH on different carriers may not be able to perform HARQ-ACK feedback corresponding to the same slot or Sub-slot, but when a dynamic (dynamic) HARQ-ACK codebook (codebook) is used, since PDSCHs on multiple carriers are commonly counted by Downlink Assignment Index (DAI) in DCI, if the PDSCHs on multiple carriers perform HARQ-ACK feedback at different slots or sub-slots, the terminal and the base station may have inconsistent understanding of the number of bits of HARQ-ACK feedback, resulting in HARQ-ACK transmission errors.

When one DCI can schedule PDSCH on multiple carriers for transmission, there is no clear scheme how to use the dynamic HARQ-ACK codebook for HARQ-ACK feedback of multiple carriers.

SUMMARY

The embodiment of the disclosure provides a method and equipment for determining a HARQ-ACK feedback time sequence, which solve the problem of how to use a dynamic HARQ-ACK codebook to perform HARQ-ACK feedback of multiple carriers.

In a first aspect, a method for determining a hybrid automatic repeat request acknowledgement (HARQ-ACK) feedback time sequence is provided in the present disclosure, applied to a terminal and including:
receiving first Downlink Control Information (DCI), where the first DCI is used for scheduling Physical Downlink Shared Channels (PDSCHs) transmissions on a plurality of carriers; and
determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

Optionally, the determining the time unit for transmitting the HARQ-ACKs of the PDSCHs on the plurality of carriers scheduled by the first DCI according to the PDSCH with the latest ending position among the PDSCHs on the plurality of carriers scheduled by the first DCI includes:
based on a time unit defined by an SCS for transmitting a Physical Uplink Control Channel (PUCCH), determining a latest time unit overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted; and
taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK.

Optionally, the determining the time unit for transmitting the HARQ-ACKs of the PDSCHs on the plurality of carriers scheduled by the first DCI according to the reference SCS includes:
determining a reference slot of each PDSCH of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS;
taking a latest reference slot within the reference slots as a first reference slot, and determining a latest time unit overlapped with the first reference slot according to time unit defined by an SCS for transmitting a PUCCH;
taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

Optionally, the feedback timing value of PDSCH to HARQ-ACK is indicated by the first DCI or configured by a high-layer signaling.

Optionally, the reference SCS includes any one of:
an SCS of a carrier where the first DCI is transmitted;
a maximum SCS among SCSs of the scheduled a plurality of carriers;
a minimum SCS among SCSs of the scheduled a plurality of carriers; or
an SCS of a carrier for transmitting a PUCCH.

Optionally, the time unit is a predefined length of plurality of symbol or a slot or a sub-slot.

Optionally, determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
the terminal is configured to use a dynamic HARQ-ACK codebook for transmission;
the plurality of carriers have a same subcarrier spacing;
the plurality of carriers have a same PDSCH processing capability;

there is no offset among slot or sub-slot index in the plurality of carriers.

In a second aspect, a method for determining a hybrid automatic repeat request acknowledgement (HARQ-ACK) feedback time sequence is provided in the present disclosure, applied to a network device and including:

sending first Downlink Control Information (DCI), where the first DCI is used for scheduling Physical Downlink Shared Channels (PDSCHs) transmissions on a plurality of carriers; and determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

Optionally, the determining the time unit for transmitting the HARQ-ACKs of the PDSCHs on the plurality of carriers scheduled by the first DCI according to the PDSCH with the latest ending position among the PDSCHs on the plurality of carriers scheduled by the first DCI includes:

based on a time unit defined by an SCS for transmitting a Physical Uplink Control Channel (PUCCH), determining a latest time unit overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted; and taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK.

Optionally, the determining the time unit for transmitting the HARQ-ACKs of the PDSCHs on the plurality of carriers scheduled by the first DCI according to the reference SCS includes:

determining a reference slot of each PDSCH of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS;

taking a latest reference slot within the reference slots as a first reference slot, and determining a latest time unit overlapped with the first reference slot according to time unit defined by an SCS for transmitting a PUCCH;

taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

Optionally, the feedback timing value of PDSCH to HARQ-ACK is indicated by the first DCI or configured by a high-layer signaling.

Optionally, the reference SCS includes any one of:
an SCS of a carrier where the first DCI is transmitted;
a maximum SCS among SCSs of the scheduled a plurality of carriers;
a minimum SCS among SCSs of the scheduled a plurality of carriers; or
an SCS of a carrier for transmitting a PUCCH.

Optionally, the time unit is a predefined length of plurality of symbol or a slot or a sub-slot.

Optionally, the determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
the terminal is configured to use a dynamic HARQ-ACK codebook for transmission;
the plurality of carriers have a same subcarrier spacing;
the plurality of carriers have a same PDSCH processing capability;
there is no offset among slot or sub-slot index in the plurality of carriers.

In a third aspect, a terminal is provided in the present disclosure, including:

a receiving module, configured to receive first Downlink Control Information (DCI), where the first DCI is used for scheduling Physical Downlink Shared Channels (PDSCHs) transmissions on a plurality of carriers;

a first determining module, configured to determine a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

Optionally, the first determining module is further configured to:

based on a time unit defined by an SCS for transmitting a Physical Uplink Control Channel (PUCCH), determine a latest time unit overlapped with the PDSCH with the latest ending position among the PDSCHs on the plurality of carriers scheduled by the first DCI, or determine a latest time unit overlapped with a slot where the PDSCH with the latest ending position among the PDSCHs on the plurality of carriers scheduled by the first DCI is transmitted; and take the determined latest time unit as a reference point for a feedback timing of PDSCH to HARQ-ACK, and determine the time unit for transmitting the HARQ-ACKs of the PDSCHs on the plurality of carriers scheduled by the first DCI, according to a feedback timing value of PDSCH to HARQ-ACK.

Optionally, the first determining module is further configured to:

determine a reference slot of each PDSCH of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS;

take a latest reference slot within the reference slots as a first reference slot, and determine the latest time unit overlapped with the first reference slot according to the time unit defined by the SCS for transmitting the PUCCH;

take the determined time unit as a reference point for the feedback timing of PDSCH to HARQ-ACK, and determine the time unit for transmitting the HARQ-ACKs of the PDSCHs on the plurality of carriers scheduled by the first DCI, based on a feedback timing value of PDSCH to HARQ-ACK.

Optionally, the reference SCS includes any one of:
an SCS of a carrier where the first DCI is transmitted;

a maximum SCS among SCSs of the scheduled a plurality of carriers;
a minimum SCS among SCSs of the scheduled a plurality of carriers; or
an SCS of a carrier for transmitting a PUCCH.

Optionally, determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
the terminal is configured to use a dynamic HARQ-ACK codebook for transmission;
the plurality of carriers have a same subcarrier spacing;
the plurality of carriers have a same PDSCH processing capability;
there is no offset among slot or sub-slot index in the plurality of carriers.

In a fourth aspect, a terminal is provided in the present disclosure, including: a first transceiver and a first processor; where
the first transceiver sends and receives data under a control of the first processor;
the first processor reads a program in a memory to perform:
receiving first Downlink Control Information (DCI), where the first DCI is used for scheduling Physical Downlink Shared Channels (PDSCHs) transmissions on a plurality of carriers; and
determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

In a fifth aspect, a network device is provided in the present disclosure, including:
a transmitting module, configured to send first Downlink Control Information (DCI), where the first DCI is used for scheduling Physical Downlink Shared Channels (PDSCHs) transmissions on a plurality of carriers;
a second determining module, configured to determine a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

In a sixth aspect, a network device is provided in the present disclosure, including: a second transceiver and a second processor; where
the second transceiver sends and receives data under a control of the second processor;
the second processor reads a program in the memory to perform:
sending first Downlink Control Information (DCI), where the first DCI is used for scheduling Physical Downlink Shared Channels (PDSCHs) transmissions on a plurality of carriers; and
determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

In a seventh aspect, a computer readable storage medium is provided in the present disclosure, where a computer program is stored in the computer readable storage medium, and the computer program is executed by a processor to perform the method for determining a hybrid automatic repeat request acknowledgement (HARQ-ACK) feedback time sequence in the first or second aspect.

According to the embodiments of the present disclosure, feedback slots or sub-slot of HARQ-ACKs of PDSCHs on multiple carriers scheduled by DCI may be determined according to a PDSCH with a latest ending position among PDSCHs on multiple carriers scheduled by reference SCS or received DCI, thereby ensuring that the PDSCHs on multiple carriers scheduled by the same DCI feed back HARQ-ACK in the same slot or sub-slot according to the same feedback timing value when SCSs of different carriers are different, and ensuring that the network device and the terminal may have inconsistent understanding of HARQ-ACK transmission, and ensuring a normal transmission of HARQ-ACK.

BRIEF DESCRIPTION OF THE DRAWINGS

Various additional advantages and benefits will become apparent to those of ordinary skill in the art upon reading the following detailed description of the embodiments. The drawings are only for purposes of illustrating the preferred embodiments and are not to be construed as limiting the disclosure. Also, like reference numerals are used to refer to like parts throughout the drawings. In the drawings:

FIG. 8 is one of the diagrams of step 602 in FIG. 6;

FIG. 9 is a second diagram of a determination method of the HARQ-ACK feedback time sequence in some embodiments of the present disclosure;

FIG. 10 is a first diagram illustrating step 902 of FIG. 9;

FIG. 11 is a second diagram illustrating the step 902 in FIG. 9;

DETAILED DESCRIPTION

Flexible timing relationships are supported in New wireless communication systems (5 Generation New RAT, 5G NR). For a Physical Downlink Shared CHannel (PDSCH), a Physical Downlink Control CHannel (PDCCH) carrying Scheduling information thereof indicates a Scheduling timing relationship (i.e., K0) between the PDSCH and the PDCCH and a feedback time sequence relationship (i.e., K1) between the PDSCH and its corresponding HARQ-ACK. Specifically, the Time Domain Resource Assignment (TDRA) indication field in the DCI format used by the PDCCH indicates the Time slot offset K0 between the Time slot in which the PDSCH is located and the Time slot in which the PDCCH (which may also be said to be DCI because DCI is a specific transmission format of the PDCCH, and both are considered equivalent in describing scheduling and feedback relationships). The PDSCH-to-HARQ-ACK feedback time sequence (PDSCH-to-HARQ feedback time sequence) indication field in the DCI format indicates the number of slots K1 between the PDSCH ending and the HARQ-ACK starting, namely the PDSCH transmitted in the slot n carries out HARQ-ACK transmission in the slot n+K1.

Figure 1:
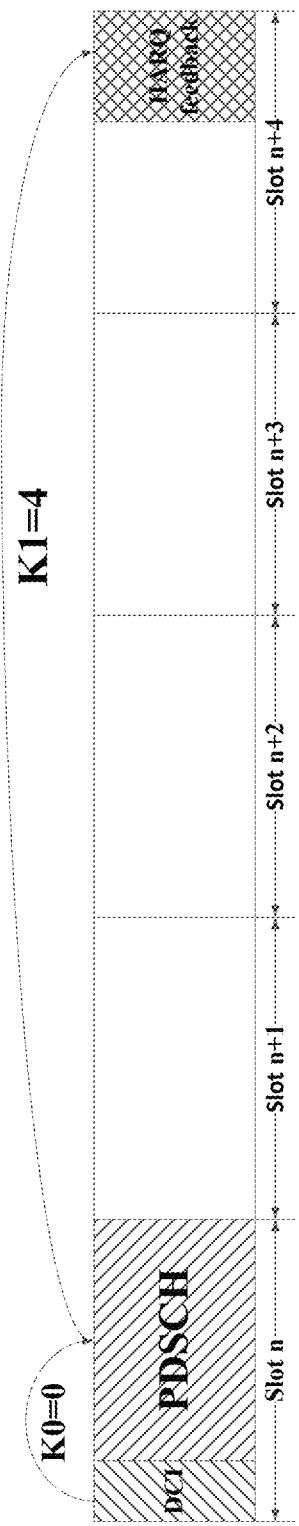
FIG. 1 is a diagram of a downlink scheduling timing sequence and an HARQ-ACK feedback time sequence.

As shown in FIG. 1, the full set of K1 is {0,1,2,3,4,5,6, 7,8,9,10,11,12,13, 14,15}, and is typically configured to a terminal with a maximum of 8 values. In Rel-15, the value of K1 is in slots (slots), i.e. K1=1 denotes an interval of 1 slot. In Rel-16, the value of K1 may be in units of slots or sub-slots (sub-slots), where a sub-slot may be preconfigured to be 2 symbols long (i.e., 7 sub-slots in sequence in one slot), or 7 symbols long (i.e., 2 sub-slots in sequence in one slot).

Figure 2:
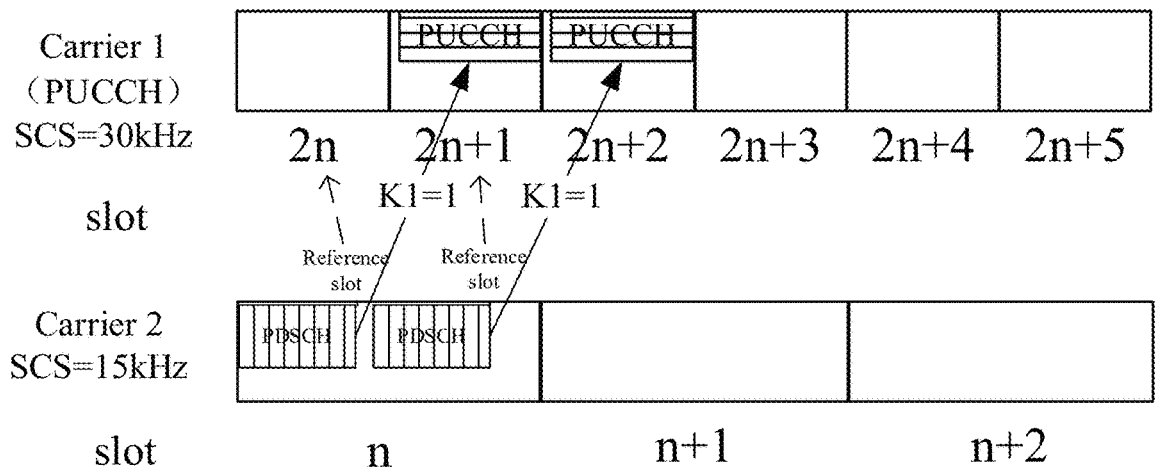
FIG. 2 is a first diagram illustrating a determination of a PUCCH slot in which a HARQ-ACK transmission is located according to a value K1.
Figure 3:
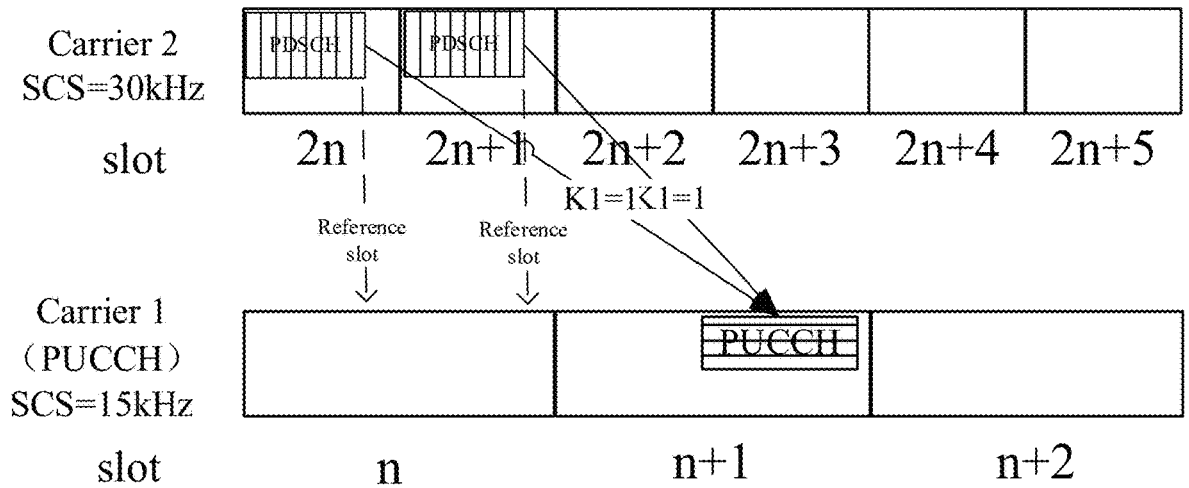
FIG. 3 is a second diagram illustrating a determination of a PUCCH slot in which a HARQ-ACK transmission is located based on a value of K1.

Specifically, for the PDSCH transmitted in slot n or the PDCCH (also referred to as SPS PDSCH release) indicating the release of Semi-Persistent Scheduling (SPS) resources, the last PUCCH slot (i.e., the slot determined by SCS on the carrier where the PUCCH is transmitted) overlapping with the end position of this PDSCH or SPS PDSCH release is first found as a reference, and the PUCCH slot where the HARQ-ACK transmission is located is further determined according to the value K1 with this reference slot as a reference point when K1=0. As shown in FIGS. 2 and 3.

Semi-static (semi-static) and dynamic (dynamic) HARQ-ACK codebook (codebook) generation methods are supported in the 5G NR system. The HARQ-ACK codebook is an HARQ-ACK feedback sequence generated for downlink transmission performing HARQ-ACK feedback on the same time domain position or uplink channel. The Dynamic HARQ-ACK codebook is configured to perform HARQ-ACK ordering according to an indication of a cumulative Downlink Assignment Index (C-DAI) field in Downlink (DL) DCI (i.e., DCI for scheduling Downlink transmission), and determine a Total bit number of the HARQ-ACK codebook according to a Total-DAI (T-DAI) field, so that the size of the HARQ-ACK codebook can be adjusted according to actual scheduling at different feedback times, thereby dynamically changing the size of the HARQ-ACK codebook, and saving HARQ-ACK feedback overhead.

Specifically, first, a PDCCH detection opportunity (monitoring interference) corresponding to a bandwidth Part (BWP) of an active bandwidth on a carrier needs to be determined according to K1, K0 and the configured number of repeated transmissions (if configured).

Figure 4:
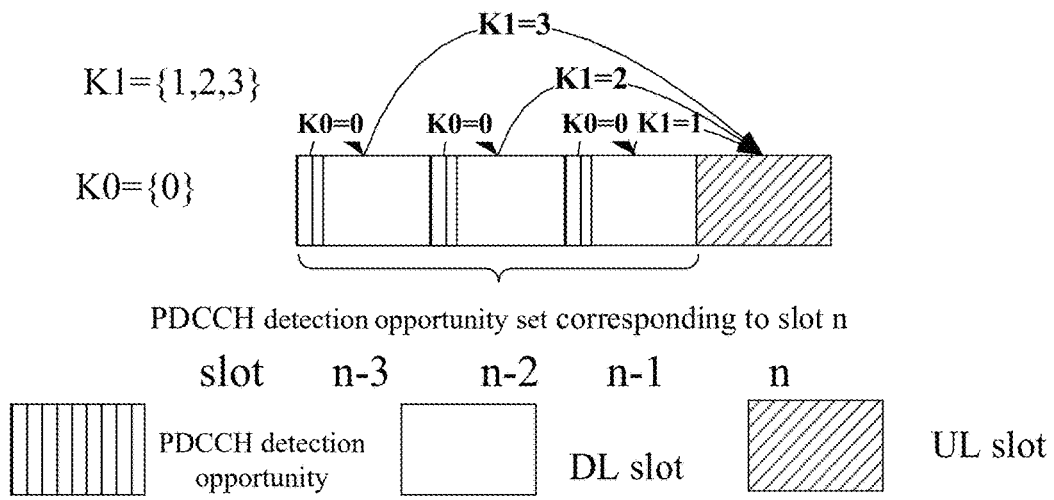
FIG. 4 is a diagram illustrating a determination of a PDCCH detection opportunity set of a dynamic HARQ-ACK codebook.
Figure 5:
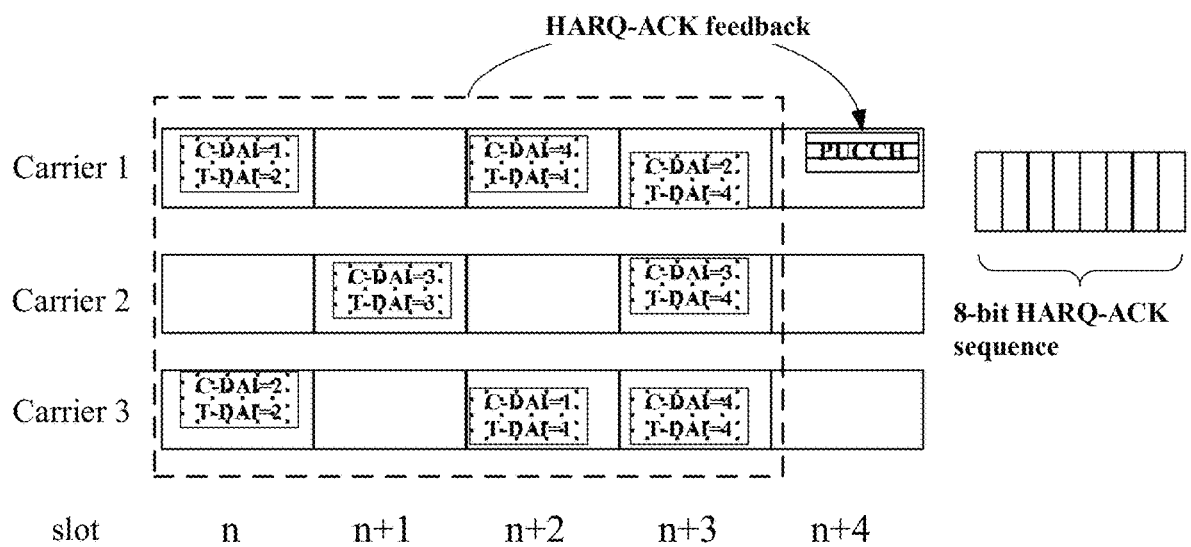
FIG. 5 is a diagram of a DAI design for a dynamic HARQ-ACK codebook.

As shown in FIG. 4, assuming that repeated transmission is not performed, i.e. a downlink transmission opportunity may be found according to N-K1, and then a corresponding PDCCH monitoring occasion is found according to a scheduling relationship of the downlink transmission opportunity, if the number of times of repetition is greater than 1, K0 of the repeatedly transmitted PDSCH is determined based on a first slot of multiple slots occupied by the repeated transmission of PDSCH, and K1 of the repeatedly transmitted PDSCH is determined based on a last slot of the multiple slots occupied by the repeated transmission of PDSCH, which means that N slots of the following row slots N-K1 to N-K1-N are a group of slots for repeated transmission of PDSCH, for which, based on PDCCH monitoring occasion determined by K0 being a PDCCH monitoring occasion corresponding to slot N-K1-N, assuming that K0 is always 0, actual K0 may be multiple values, and if the group of slots is multiple values, a downlink slot corresponding to N-K1 may determine multiple PDCCH monitoring occasions, each slot may also include a plurality of PDCCH monitoring instances. Under the condition of carrier aggregation, a PDCCH monitoring localization full set of all carriers is obtained based on a PDCCH monitoring localization corresponding to each carrier, where the PDCCH monitoring localization on different carriers may not be aligned in time, and are ordered in a manner of first time (time sequence) and then frequency domain (i.e. from small carrier serial number to large carrier serial number). The terminal detects a PDCCH using a certain DCI format (such as one or more of format 1-0, format 1-1 and format 1-2) in the determined PDCCH monitoring envelope set, and generates a HARQ-ACK codebook according to DAI information (including C-DAI and T-DAI) in the received PDCCH, assuming that the C-DAI and the T-DAI in the DCI are set based on the PDCCH monitoring envelope set. And the C-DAI indicates the PDSCH transmitted by the current PDCCH monitoring occasion on the current carrier or indicates the accumulated number of the PDCCHs released by the SPS PDSCH according to the sequence of the frequency domain and the time domain. The T-DAI indicates the number of PDSCHs transmitted on all carriers in total to the current PDCCH monitoring occasion or indicates the number of PDCCHs released by the SPS PDSCH. The T-DAIs in the DCI in the PDCCH monitoring interference aligned in time domain on multiple carriers are the same, which is specifically shown in FIG. 5, where C-DAI and T-DAI take 2 bits as examples, and a value exceeding 4 is expressed in a modulo manner by the same DAI state, for example, a 2-bit DAI "00" state may represent values of 1\5\9, etc.

When one DCI can schedule PDSCHs on multiple carriers for transmission, and when the DAIs in the DCI accumulate the PDSCHs on the multiple scheduled carriers, it is necessary to ensure that the PDSCHs on the plurality of carriers perform HARQ-ACK feedback in the same slot or sub-slot, so as to ensure that the sizes of HARQ-ACK sequences determined by the network device and the terminal according to the DAIs in the DCI are understood to be consistent. When the same value of K1 is indicated for the PDSCH on multiple scheduled carriers in the DCI, according to the related art, if SCS of the plurality of carriers is different, HARQ-ACK feedback for the PDSCH on the plurality of carriers at the same slot or sub-slot cannot be guaranteed, and at this time, there is no clear scheme for how to use the dynamic HARQ-ACK codebook for HARQ-ACK feedback for the plurality of carriers.

The embodiments of the present disclosure will be described clearly and completely with reference to the accompanying drawings in the embodiments of the present disclosure, and it is to be understood that the described embodiments are only some embodiments, but not all embodiments, of the present disclosure. All other embodiments, which can be derived by a person skilled in the art from the embodiments disclosed herein without inventive step, are intended to be within the scope of the present disclosure.

The terms "includes" "including" or any other variation thereof, in the description and claims of this application are intended to cover a non-exclusive inclusion, such that a process, method, system, article, or apparatus that includes a list of steps or elements is not necessarily limited to those steps or elements explicitly listed, but may include other steps or elements not expressly listed or inherent to such process, method, article, or apparatus. Furthermore, the use of "and/or" in the specification and claims means that at least one of the connected objects, e.g., A and/or B, means that three conditions exist including A alone, B alone, and both A and B.

In the embodiments of the present disclosure, words such as "exemplary" or "for example" are used to mean serving as an example, instance, or illustration. Any embodiment or design described as "exemplary" or "such as" in the embodiments of the present disclosure is not necessarily to be construed as preferred or advantageous over other embodiments or designs. Rather, use of the word "exemplary" or "such as" is intended to present relevant concepts in a concrete fashion.

The techniques described herein are not limited to Long-term Evolution (LTE)/LTE-Advanced (LTE-a) systems, and may also be used for various wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency Division Multiple Access (SC-FDMA), and other systems.

The terms "system" and "network" are often used interchangeably. CDMA systems may implement Radio technologies such as CDMA2000, Universal Terrestrial Radio Access (UTRA), and so on. UTRA includes Wideband CDMA (WCDMA) and other CDMA variants. TDMA systems may implement radio technologies such as Global System for Mobile communications (GSM). The OFDMA system may implement radio technologies such as Ultra Mobile Broadband (UMB), evolved-UTRA (E-UTRA), IEEE 802.11 (Wi-Fi), IEEE 802.16 (WiMAX), IEEE 802.20, Flash-OFDM, etc. UTRA and E-UTRA are parts of the Universal Mobile Telecommunications System (UMTS). LTE and LTE-advanced (e.g., LTE-A) are new UMTS releases that use E-UTRA. UTRA, E-UTRA, UMTS, LTE-A and GSM are described in the literature from an organization named "third Generation Partnership Project" (3 GPP). CDMA2000 and UMB are described in documents from an organization named "third generation partnership project 2" (3 GPP 2). The techniques described herein may be used for both the above-mentioned systems and radio technologies, as well as for other systems and radio technologies.

Figure 6:
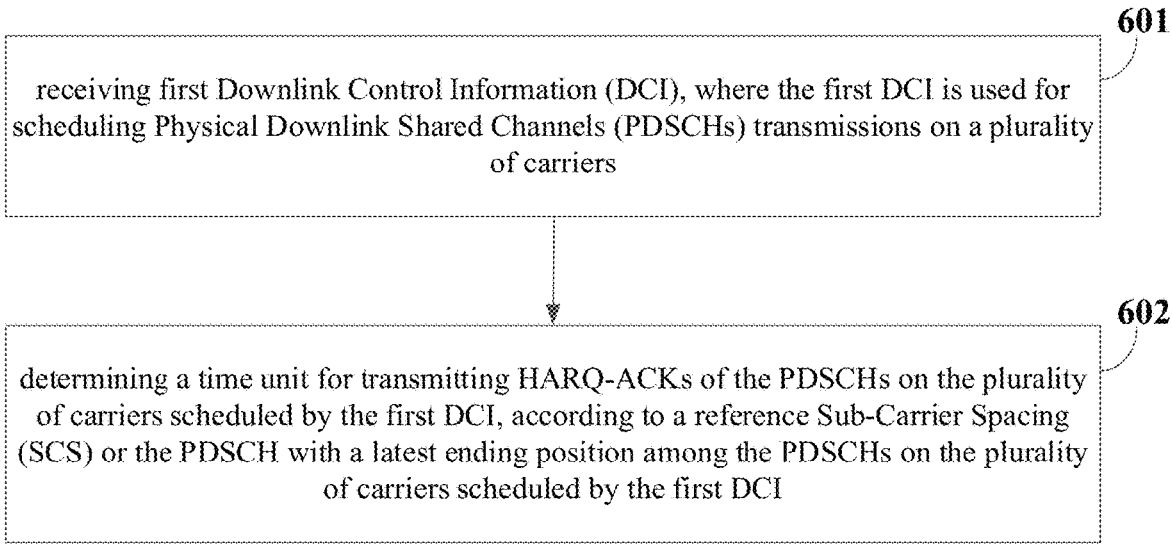
FIG. 6 is a first diagram of a determination method of the HARQ-ACK feedback time sequence in some embodiments of the present disclosure.

Referring to FIG. 6, some embodiments of the present disclosure provide a method for determining HARQ-ACK feedback time sequence, where an execution subject of the method may be a terminal, and the method includes: step 601 and step 602.

Step 601: receiving first Downlink Control Information (DCI), where the first DCI is used for scheduling Physical Downlink Shared Channels (PDSCHs) transmissions on a plurality of carriers;

Step 602: determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

It can be appreciated that the reference SCS may be used to determine a common time unit for HARQ-ACK transmission for PDSCH on multiple carriers scheduled by one first DCI, and when different carriers may have different SCS or DL and UL have different SCS, the determination of time unit for HARQ-ACK transmission with reference to the respective SCS may result in different time units for HARQ-ACK transmission for multiple PDSCH.

Figure 7:
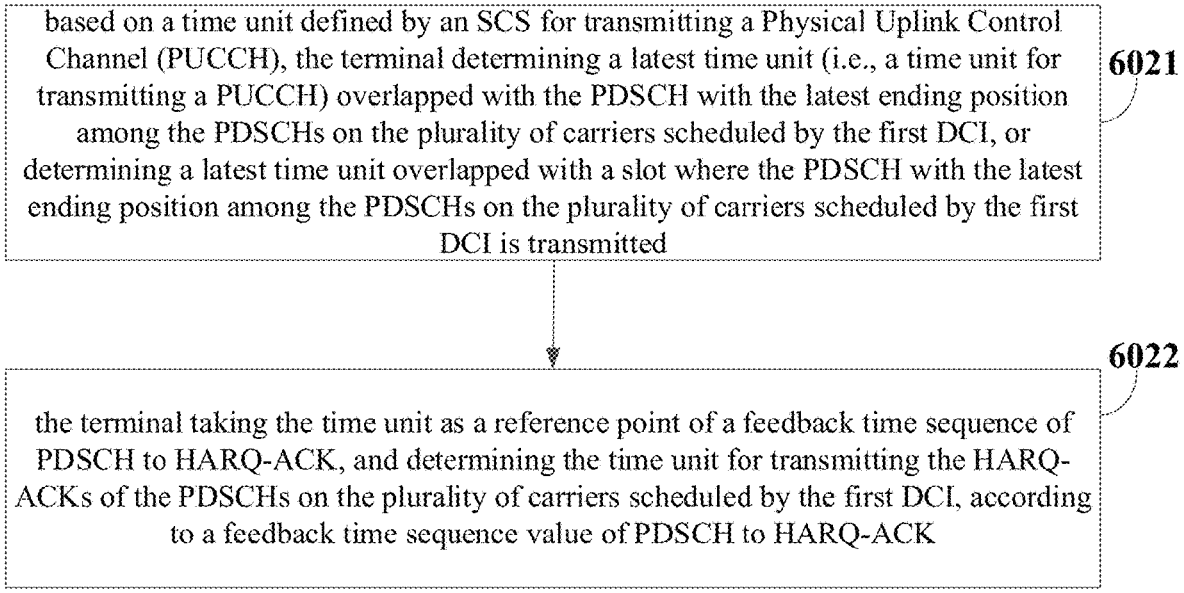
FIG. 7 is one of the diagrams of step 602 in FIG. 6.

In some embodiments, referring to FIG. 7, step 602 may include:

Step 6021: based on a time unit defined by an SCS for transmitting a Physical Uplink Control Channel (PUCCH), the terminal determining a latest time unit (i.e., a time unit for transmitting a PUCCH) overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted.

it can be understood that, in step 6021, reference is made to a time unit for transmitting the PUCCH, i.e., a time unit division on a carrier on which the PUCCH is transmitted, i.e., a time unit, such as a slot, a sub-slot, etc., divided by SCS of the PUCCH.

Step 6022: the terminal taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK.

It is understood that the reference point in step 6022 may be understood as a corresponding time unit with the determined time unit as the feedback timing value of PDSCH to HARQ-ACK being 0.

In other embodiments, referring to FIG. 8, step 602 may include:

Step 6023: the terminal determining a reference slot of each PDSCH of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS;

Step 6024: the terminal taking a latest reference slot within the reference slots as a first reference slot, and determining a latest time unit overlapped with the first reference slot according to time unit defined by an SCS for transmitting a PUCCH;

it can be understood that the first reference slot is a reference slot for determining the HARQ-ACK feedback position, and if there is only one reference slot, the reference slot is the reference slot for determining the HARQ-ACK feedback position.

Step 6025: taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

It may be understood that the PDSCH-to-HARQ-ACK feedback timing value is indicated by the first DCI or configured by high-layer signaling.

In some embodiments of the disclosure, optionally, the reference SCS includes any one of:
(1) an SCS of a carrier where the first DCI is transmitted;
(2) a maximum SCS among SCSs of the scheduled a plurality of carriers;
(3) a minimum SCS among SCSs of the scheduled a plurality of carriers;
(4) an SCS of a carrier for transmitting a PUCCH.

In some embodiments of the present disclosure, determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
(1) the terminal is configured to use a dynamic HARQ-ACK codebook for transmission;
(2) the plurality of carriers have a same subcarrier spacing;
(3) the plurality of carriers have a same PDSCH processing capability;
(4) there is no offset among slot or sub-slot index in the plurality of carriers.

According to the embodiments of the present disclosure, the terminal determines feedback slots or sub-slot of HARQ-ACKs of PDSCHs on multiple carriers scheduled by DCI according to a PDSCH with a latest ending position among PDSCHs on multiple carriers scheduled by reference SCS or received DCI, thereby ensuring that the PDSCHs on multiple carriers scheduled by the same DCI feed back HARQ-ACK in the same slot or sub-slot according to the same feedback timing value when SCSs of different carriers are different, and ensuring that the network device and the terminal may have inconsistent understanding of HARQ-ACK transmission, and ensuring a normal transmission of HARQ-ACK.

Referring to FIG. 9, some embodiments of the present disclosure provide a method for determining HARQ-ACK feedback time sequence, where an execution subject of the method may be a network device, and the method includes: step 901 and step 902.

Step 901: sending first Downlink Control Information (DCI), where the first DCI is used for scheduling Physical Downlink Shared Channels (PDSCHs) transmissions on a plurality of carriers;

Step 902: determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

In some embodiments, referring to FIG. 10, step 902 may include:
Step 9021: based on a time unit defined by an SCS for transmitting a Physical Uplink Control Channel (PUCCH), the network device determining a latest time unit (i.e., the time unit for transmitting PUCCH) overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted;

it can be understood that, in Step 9021, reference is made to a time unit for transmitting the PUCCH, that is, a time unit division on a carrier on which the PUCCH is transmitted, that is, a time unit, such as a slot, a sub-slot, etc., divided by SCS of the PUCCH.

Step 9022: the network device taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK.

It can be understood that the reference point in step 9022 may be understood as a time unit corresponding to the determined time unit as the PDSCH-to-HARQ-ACK feedback timing value of 0.

In other embodiments, referring to FIG. 11, Step 902 may include:
Step 9023: the network device determining a reference slot of each PDSCH of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS;

Step 9024: the network device taking a latest reference slot within the reference slots as a first reference slot, and determining a latest time unit overlapped with the first reference slot according to time unit defined by an SCS for transmitting a PUCCH;

it can be understood that the first reference slot is a reference slot for determining the HARQ-ACK feedback position, and if there is only one reference slot, the reference slot is the reference slot for determining the HARQ-ACK feedback position.

Step 9025: the network device taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

It may be understood that the PDSCH-to-HARQ-ACK feedback timing value is indicated by the first DCI or configured by high-layer signaling.

In some embodiments of the disclosure, the reference SCS includes any one of:
(1) an SCS of a carrier where the first DCI is transmitted;
(2) a maximum SCS among SCSs of the scheduled a plurality of carriers;
(3) a minimum SCS among SCSs of the scheduled a plurality of carriers;
(4) an SCS of a carrier for transmitting a PUCCH.

In some embodiments of the present disclosure, optionally, the time unit is a predefined length of plurality of symbol or one slot or one sub-slot.

In some embodiments of the present disclosure, the determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:

(1) the terminal is configured to use a dynamic HARQ-ACK codebook for transmission;
(2) the plurality of carriers have a same subcarrier spacing;
(3) the plurality of carriers have a same PDSCH processing capability;
(4) there is no offset among slot or sub-slot index in the plurality of carriers.

According to the embodiments of the present disclosure, the network device determines feedback slots or sub-slot of HARQ-ACKs of PDSCHs on multiple carriers scheduled by DCI according to a PDSCH with a latest ending position among PDSCHs on multiple carriers scheduled by reference SCS or received DCI, thereby ensuring that the PDSCHs on multiple carriers scheduled by the same DCI feed back HARQ-ACK in the same slot or sub-slot according to the same feedback timing value when SCSs of different carriers are different, and ensuring that the network device and the terminal may have inconsistent understanding of HARQ-ACK transmission, and ensuring a normal transmission of HARQ-ACK.

Embodiments of the present disclosure are described below with reference to example 1 and example 2.

Figure 12:
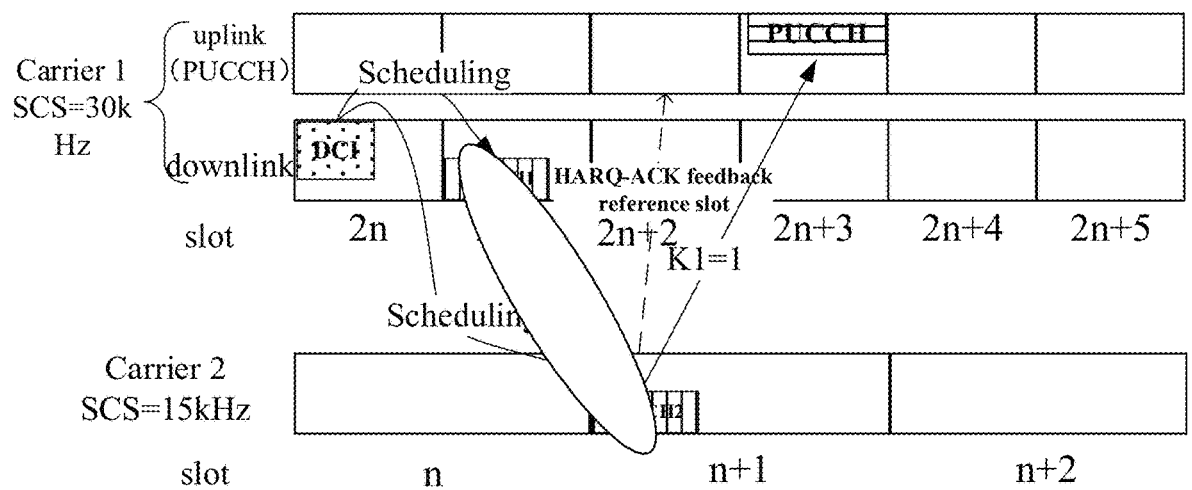
FIG. 12 is a first diagram illustrating a determination of HARQ-ACK feedback time sequence in some embodiments of the present disclosure.
Figure 13:
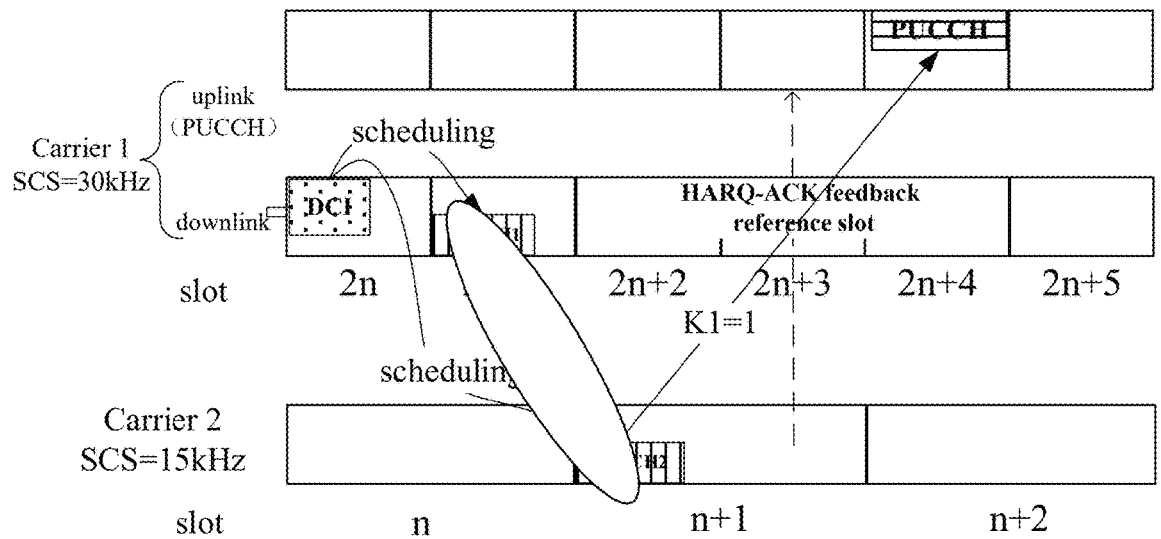
FIG. 13 is a second diagram illustrating a determination of HARQ-ACK feedback time sequence in some embodiments of the present disclosure.

Example 1: as shown in FIGS. 12 and 13, the HARQ-ACK feedback slot common to PDSCH1 and PDSCH2 is determined according to PDSCH2, which is the latest PDSCH among 2 PDSCHs scheduled by the same DCI on carrier 1 and carrier 2:

method 1: finding the latest PUCCH slot overlapping PDSCH2 (i.e., UL slot on carrier 1), i.e., carrier 1 uplink slot 2n+2, when K1=1 is indicated in the DCI, with 2n+2 as a reference point (i.e., the slot when K0-0 is this slot), then K1=1 indicates that the feedback slot of HARQ-ACK is slot 2n+3 on carrier 1, i.e., it is determined that HARQ-ACK for PDSCH1 and PDSCH2 is transmitted in slot 2n+3; as shown in FIG. 12;

method 2: find the latest PUCCH slot (i.e. UL slot on carrier 1) overlapping with the PDSCH2 slot (i.e. slot n+1 on carrier 2 where PDSCH2 is located), i.e. carrier 1 uplink slot 2n+3, when K1=1 indicated in DCI, take 2n+3 as the reference slot of K1, then K1=1 indicates that the feedback slot of HARQ-ACK is slot 2n+4 on carrier 1, i.e. determine HARQ-ACK for transmitting PDSCH1 and PDSCH2 in slot 2n+4, as shown in FIG. 13.

The terminal sends the feedback sequence containing HARQ-ACK of PDSCH1 and PDSCH2 through PUCCH (of course, through PUSCH without affecting the time (timing) design) in the determined feedback slot, and the base station receives the feedback sequence containing HARQ-ACK of PDSCH1 and PDSCH2 through PUCCH in this slot.

The beneficial effects of this embodiment: in the related art, if each PDSCH is respectively fed back according to its corresponding reference PUCCH slot and K1, it is determined that the latest PUCCH slot overlapping PDSCH1 is slot 2n+1, and when 2n+1 is used as a reference, it is obtained that PDSCH1 feeds back HARQ-ACK at slot 2n+2, which results in HARQ-ACK feedback at a different slot from PDSCH2, according to K1=1.

Figure 14:
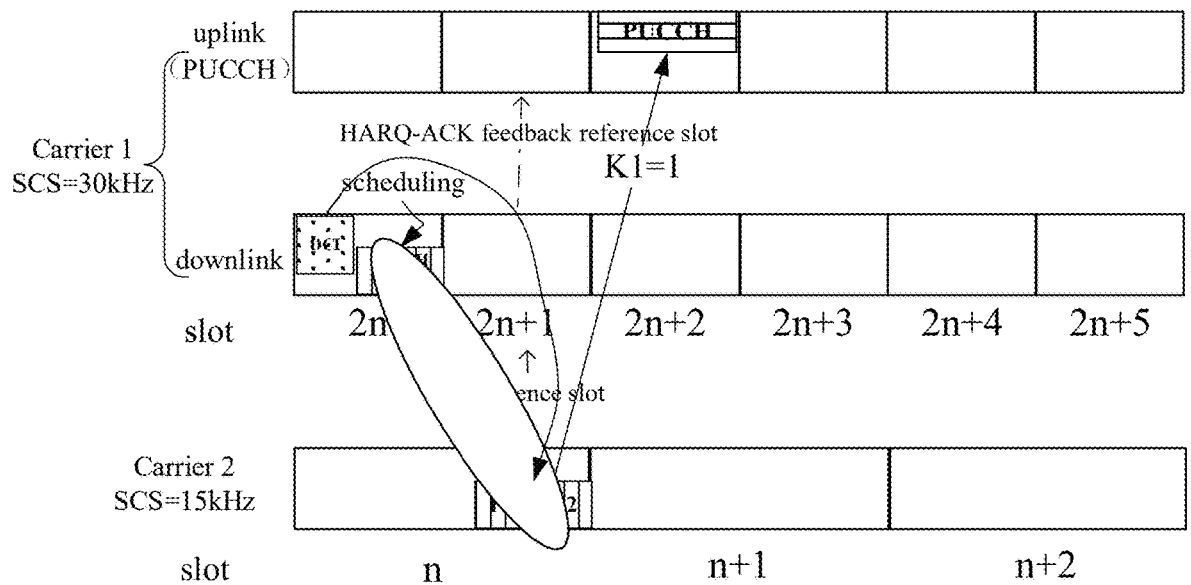
FIG. 14 is a third diagram illustrating a determination of HARQ-ACK feedback time sequence in some embodiments of the present disclosure.
Figure 15:
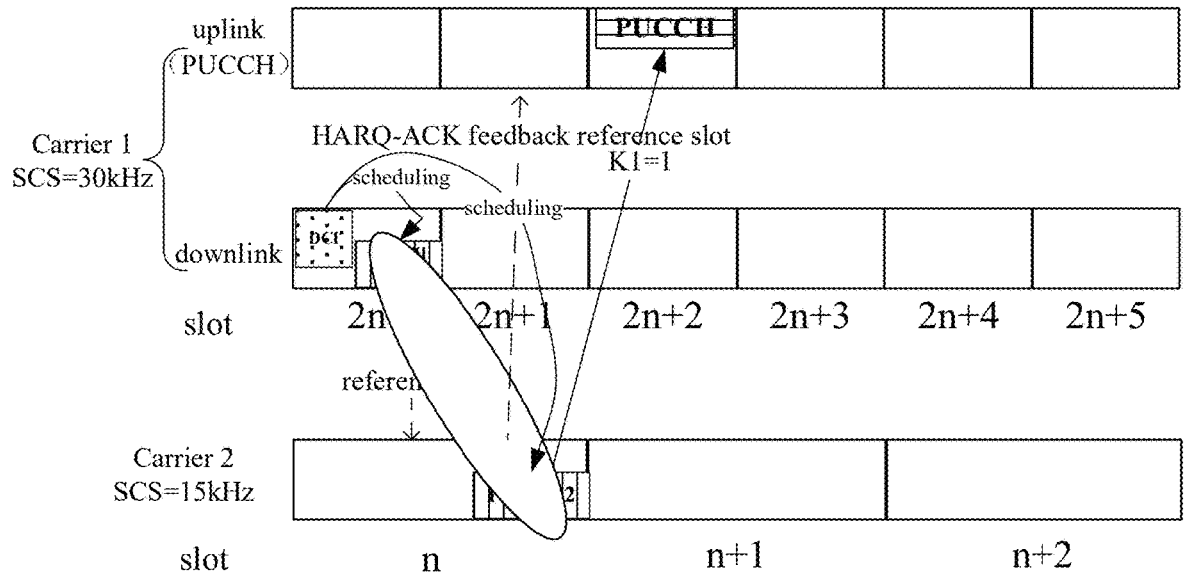
FIG. 15 is a fourth diagram illustrating a determination of HARQ-ACK feedback time sequence in some embodiments of the present disclosure.

Example 2: as shown in FIGS. 14 and 15, the HARQ-ACK feedback slots common to 2 PDSCHs scheduled by the same DCI on carrier 1 and carrier 2 are determined according to the reference SCS:

method 1: the method includes the steps of taking a DCI SCS (namely a downlink SCS of a carrier where DCI is transmitted) as a reference SCS, namely the downlink SCS of a carrier 1, namely 30 kHz, as the reference SCS, determining a reference slot of a PDSCH1 as a slot 2n on the carrier 1 according to slot division of the reference SCS, namely slot division on the carrier 1, determining the reference slot of the PDSCH1 as a slot 2n on the carrier 1, determining the reference slot of a PDSCH2 as a slot 2n+1 on the carrier 1, determining the latest one of the two reference slots as a slot 2n+1, and taking the slot 2n+1 as a first reference slot to find the last PUCCH slot overlapped with the first reference slot on the PUCCH carrier (namely each slot on the PUCCH carrier is considered as a slot capable of transmitting the PUCCH), namely an UL slot 2n+1 on the carrier 1.

Taking UL slot 2n+1 on carrier 1 as a reference point (i.e., the slot when K0=0 is this slot), when K1=1 indicated in DCI, the feedback slot of HARQ-ACK is determined to be slot 2n+2 on carrier 1, i.e., HARQ-ACK for transmitting PDSCH1 and PDSCH2 in slot 2n+2 is determined; as shown in FIG. 14.

method 2: with the smallest SCS of multiple carriers scheduled by DCI (i.e., downlink SCS) as a reference SCS, that is, 15 kHz of carrier 2 as a reference SCS, according to the slot division of the reference SCS, that is, the slot division on carrier 2, then based on the slot division on carrier 2, determine the reference slot of PDSCH1 as slot n on carrier 2, determine the reference slot of PDSCH2 as slot n on carrier 2, and only one reference slot, then this reference slot is the first reference slot, find the last PUCCH slot on PUCCH carrier that overlaps this first reference slot (i.e., each slot on PUCCH carrier is considered as a slot that can transmit PUCCH), that is, UL slot 2n+1 on carrier 1, use UL slot 2n+1 on carrier 1 as a reference point (i.e., the slot when K0=0 is this slot), when indicated in DCI, K1=1, determine the feedback slot of HARQ-ACK as slot 2n+2 on carrier 1, that is, HARQ-ACK for transmitting PDSCH1 and PDSCH2 in slot 2n+2 is determined as shown in FIG. 15.

method 3: with reference to the SCS of the PUCCH (i.e., the uplink SCS of the carrier where the PUCCH is transmitted), the PUCCH and the DCI are on the same carrier, and the SCS of the PUCCH is the same as the SCS of the DCI.

It can be understood that the reference SCS-based processing in the method 3 is the same as the method 1, and is not described again.

method 4: the maximum SCS in SCS of multiple carriers (i.e. downlink SCS) scheduled by DCI is used as a reference SCS, i.e. 30 kHz of carrier 1 is used as a reference SCS, and the specific implementation process is similar to that of method 1 and is not described again;

the above method finds the PDSCH reference slot according to the rule of overlapping with the PDSCH itself, and if the PDSCH reference slot is found according to the rule of overlapping with the slot where the PDSCH is transmitted, the above method may be continued.

It is understood that the terminal sends the feedback sequence containing HARQ-ACK of PDSCH1 and PDSCH2 through PUCCH (of course, through PUSCH without affecting the timing design) in the above determined slot, and the base station receives the feedback sequence containing HARQ-ACK of PDSCH1 and PDSCH2 through PUCCH in this slot.

It should be noted that, in the above embodiment, the HARQ-ACK feedback based on slots is only taken as an example (that is, the unit of K1 is a slot), and the same manner applies to the HARQ-ACK feedback based on sub-slots (that is, the unit of K1 is a sub-slot).

In the above embodiments, the SCS of carriers 1 and 2 is only an example, and may also be other SCS combinations, the DCI on carrier 1 schedules the PDSCH on carrier 1 and carrier 2 simultaneously, and may also be the DCI on one carrier to schedule more carriers, and the scheduled carrier may contain the carrier or may not contain the carrier (i.e. if the DCI is transmitted on carrier 1, the DCI scheduled carrier may or may not contain carrier 1), and the same applies in these cases.

The Frequency Division Duplex (FDD) is taken as an example, and the above method is also applicable if TDD alternates uplink and downlink slots TDM and uplink slots TDM on the same carrier.

Figure 16:
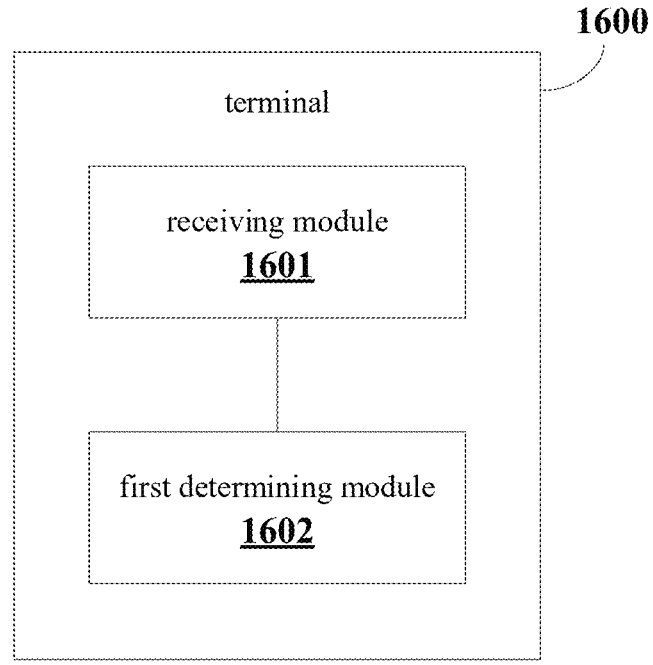
FIG. 16 is a first diagram of a terminal in some embodiments of the present disclosure.

Referring to FIG. 16, some embodiments of the present disclosure also provide a terminal 1600 including:

a receiving module 1601 configured to receive first Downlink Control Information (DCI), where the first DCI is used for scheduling Physical Downlink Shared Channels (PDSCHs) transmissions on a plurality of carriers;

a first determining module 1602, configured to determine a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

In some embodiments, the first determining module 1602 is further to:

based on a time unit defined by an SCS for transmitting a Physical Uplink Control Channel (PUCCH), determine a latest time unit overlapped with the PDSCH with the latest ending position among the PDSCHs on the plurality of carriers scheduled by the first DCI, or determine a latest time unit overlapped with a slot where the PDSCH with the latest ending position among the PDSCHs on the plurality of carriers scheduled by the first DCI is transmitted; and take the determined latest time unit as a reference point for a feedback timing of PDSCH to HARQ-ACK, and determine the time unit for transmitting the HARQ-ACKs of the PDSCHs on the plurality of carriers scheduled by the first DCI, according to a feedback timing value of PDSCH to HARQ-ACK.

In some embodiments, the first determining module 1602 is further to:

determine a reference slot of each PDSCH of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS;

take a latest reference slot within the reference slots as a first reference slot, and determine the latest time unit overlapped with the first reference slot according to the time unit defined by the SCS for transmitting the PUCCH;

take the determined time unit as a reference point for the feedback timing of PDSCH to HARQ-ACK, and determine the time unit for transmitting the HARQ-ACKs of the PDSCHs on the plurality of carriers scheduled by the first DCI, based on a feedback timing value of PDSCH to HARQ-ACK.

In some embodiments, the PDSCH-to-HARQ-ACK feedback timing value is indicated by the first DCI or configured for high-layer signaling.

In some embodiments, the reference SCS includes any one of:
(1) an SCS of a carrier where the first DCI is transmitted;
(2) a maximum SCS among SCSs of the scheduled a plurality of carriers;
(3) a minimum SCS among SCSs of the scheduled a plurality of carriers;
(4) an SCS of a carrier for transmitting a PUCCH.

In some embodiments, the time unit is a predefined length of plurality of symbol or a slot or a sub-slot.

In some embodiments, determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
(1) the terminal is configured to use a dynamic HARQ-ACK codebook for transmission;
(2) the plurality of carriers have a same subcarrier spacing;
(3) the plurality of carriers have a same PDSCH processing capability;
(4) there is no offset among slot or sub-slot index in the plurality of carriers.

The terminal provided in some embodiments of the present disclosure may execute the method embodiments shown in FIG. 6, FIG. 7, and FIG. 8, and the implementation principle and technical effect are similar, which are not described herein again.

Figure 17:
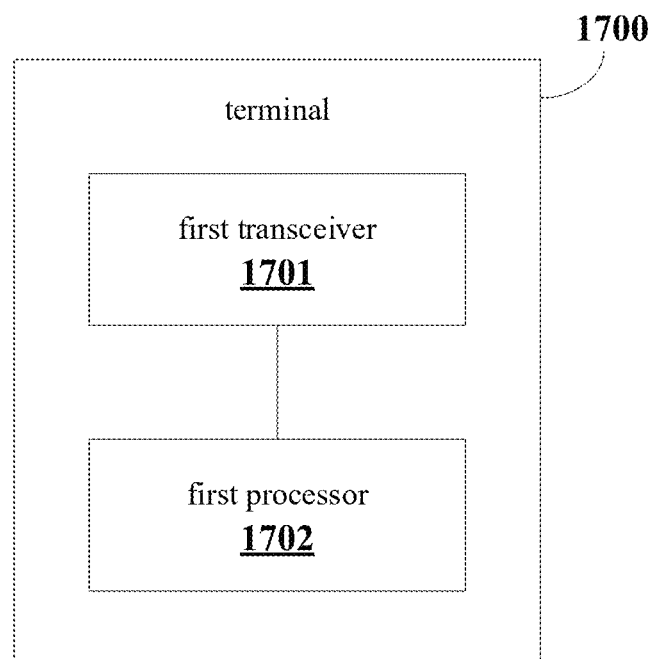
FIG. 17 is a second diagram of a terminal in some embodiments of the present disclosure.

Referring to FIG. 17, some embodiments of the present disclosure also provide a terminal, the terminal 1700 including: a first transceiver 1701 and a first processor 1702;

the first transceiver 1701 transmits and receives data under the control of the first processor 1702;

the first processor 1702 reads a program in memory to perform the following operations: receiving first Downlink Control Information (DCI), where the first DCI is used for scheduling Physical Downlink Shared Channels (PDSCHs) transmissions on a plurality of carriers; determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

In some embodiments, the first processor 1702 reads a program in memory to perform the following operations: based on a time unit defined by an SCS for transmitting a Physical Uplink Control Channel (PUCCH), determining a latest time unit overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted;

taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK.

In some embodiments, the first processor 1702 reads a program in memory to perform the following operations: determining a reference slot of each PDSCH of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS; taking a latest reference slot within the reference slots as a first reference slot, and determining a latest time unit overlapped with the first reference slot according to time unit defined by an SCS for transmitting a PUCCH; taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

In some embodiments, the PDSCH-to-HARQ-ACK feedback timing value is indicated by the first DCI or configured for high-layer signaling.

In some embodiments, the reference SCS includes any one of:
  (1) an SCS of a carrier where the first DCI is transmitted;
  (2) a maximum SCS among SCSs of the scheduled a plurality of carriers;
  (3) a minimum SCS among SCSs of the scheduled a plurality of carriers;
  (4) an SCS of a carrier for transmitting a PUCCH.

In some embodiments, the time unit is a predefined length of plurality of symbol or a slot or a sub-slot.

In some embodiments, determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
  (1) the terminal is configured to use a dynamic HARQ-ACK codebook for transmission;
  (2) the plurality of carriers have a same subcarrier spacing;
  (3) the plurality of carriers have a same PDSCH processing capability;
  (4) there is no offset among slot or sub-slot index in the plurality of carriers.

The terminal provided in some embodiments of the present disclosure may execute the method embodiments shown in FIG. 6, FIG. 7, and FIG. 8, and the implementation principle and technical effect are similar, which are not described herein again.

Figure 18:
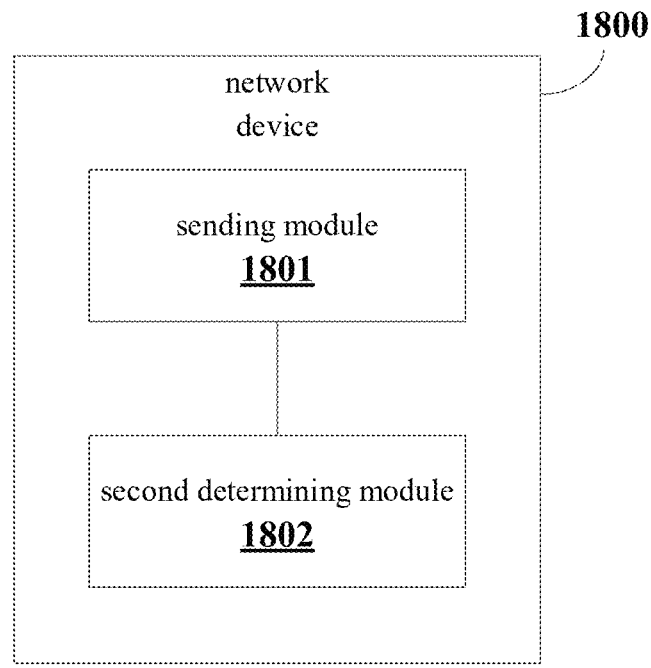
FIG. 18 is a first diagram of a network device in some embodiments of the present disclosure.

Referring to FIG. 18, some embodiments of the present disclosure also provide a network device 1800 including:
  a sending module 1801, configured to send first Downlink Control Information (DCI), where the first DCI is used for scheduling Physical Downlink Shared Channels (PDSCHs) transmissions on a plurality of carriers;
  a second determining module 1802, configured to determine a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

In some embodiments, the second determining module 1802 is further configured to:
  based on a time unit defined by an SCS for transmitting a Physical Uplink Control Channel (PUCCH), determine a latest time unit overlapped with the PDSCH with the latest ending position among the PDSCHs on the plurality of carriers scheduled by the first DCI, or determine a latest time unit overlapped with a slot where the PDSCH with the latest ending position among the PDSCHs on the plurality of carriers scheduled by the first DCI is transmitted; and
  take the determined latest time unit as a reference point for a feedback timing of PDSCH to HARQ-ACK, and determine the time unit for transmitting the HARQ-ACKs of the PDSCHs on the plurality of carriers scheduled by the first DCI, according to a feedback timing value of PDSCH to HARQ-ACK.

In some embodiments, the second determining module 1802 is further configured to:
  determine a reference slot of each PDSCH of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS;
  take a latest reference slot within the reference slots as a first reference slot, and determine the latest time unit overlapped with the first reference slot according to the time unit defined by the SCS for transmitting the PUCCH;
  take the determined time unit as a reference point for the feedback timing of PDSCH to HARQ-ACK, and determine the time unit for transmitting the HARQ-ACKs of the PDSCHs on the plurality of carriers scheduled by the first DCI, based on a feedback timing value of PDSCH to HARQ-ACK.

In some embodiments, the PDSCH-to-HARQ-ACK feedback timing value is indicated by the first DCI or configured for high-layer signaling.

In some embodiments, the reference SCS includes any one of:
  (1) an SCS of a carrier where the first DCI is transmitted;
  (2) a maximum SCS among SCSs of the scheduled a plurality of carriers;
  (3) a minimum SCS among SCSs of the scheduled a plurality of carriers;
  (4) an SCS of a carrier for transmitting a PUCCH.

In some embodiments, the time unit is a predefined length of plurality of symbol or a slot or a sub-slot.

In some embodiments, determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
  (1) the terminal is configured to use a dynamic HARQ-ACK codebook for transmission;
  (2) the plurality of carriers have a same subcarrier spacing;
  (3) the plurality of carriers have a same PDSCH processing capability;
  (4) there is no offset among slot or sub-slot index in the plurality of carriers.

The network device provided in some embodiments of the present disclosure may execute the method embodiments shown in FIG. 9, FIG. 10, and FIG. 11, which have similar implementation principles and technical effects, and this embodiment is not described herein again.

Figure 19:
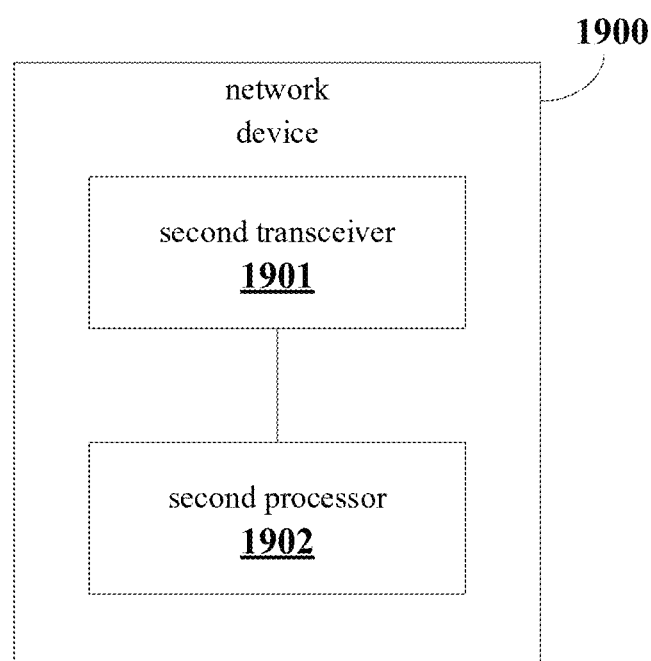
FIG. 19 is a second diagram of a network device in some embodiments of the present disclosure.

Referring to FIG. 19, some embodiments of the present disclosure also provide a network device, the network device 1900 includes: a second transceiver 1901 and a second processor 1902;
  the second transceiver 1901 transmits and receives data under the control of the second processor 1902;

the second processor 1902 reads a program in the memory and performs the following operations: sending first Downlink Control Information (DCI), where the first DCI is used for scheduling Physical Downlink Shared Channels (PDSCHs) transmissions on a plurality of carriers, and determining a time unit for transmitting HARQ-ACKs of the PDSCHs on the plurality of carriers scheduled by the first DCI, according to a reference Sub-Carrier Spacing (SCS) or the PDSCH with a latest ending position among the PDSCHs on the plurality of carriers scheduled by the first DCI.

In some embodiments, the second processor 1902 reads a program in memory to perform the following operations: based on a time unit defined by an SCS for transmitting a Physical Uplink Control Channel (PUCCH), determining a latest time unit overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted; and taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK.

In some embodiments, the second processor 1902 reads a program in memory to perform the following operations: determining a reference slot of each PDSCH of the PDSCHs on the plurality of carriers scheduled by the first DCI, where the reference slot includes: a last slot overlapped with the PDSCH or a last slot overlapped with a slot in which the PDSCH is located, the reference slot is defined based on the reference SCS;

taking a latest reference slot within the reference slots as a first reference slot, and determining a latest time unit overlapped with the first reference slot according to time unit defined by an SCS for transmitting a PUCCH;

taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

In some embodiments, the PDSCH-to-HARQ-ACK feedback timing value is indicated by the first DCI or configured for high-layer signaling.

In some embodiments, the reference SCS includes any one of:
(1) an SCS of a carrier where the first DCI is transmitted;
(2) a maximum SCS among SCSs of the scheduled a plurality of carriers;
(3) a minimum SCS among SCSs of the scheduled a plurality of carriers;
(4) an SCS of a carrier for transmitting a PUCCH.

In some embodiments, the time unit is a predefined length of plurality of symbol or a slot or a sub-slot.

In some embodiments, determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
(1) the terminal is configured to use a dynamic HARQ-ACK codebook for transmission;
(2) the plurality of carriers have a same subcarrier spacing;
(3) the plurality of carriers have a same PDSCH processing capability;
(4) there is no offset among slot or sub-slot index in the plurality of carriers.

The network device provided in some embodiments of the present disclosure may execute the method embodiments shown in FIG. 9, FIG. 10, and FIG. 11, which have similar implementation principles and technical effects, and this embodiment is not described herein again.

The steps of a method or algorithm described in connection with the disclosure herein may be embodied in hardware or may be embodied in software instructions executed by a processor. The software instructions may be included of corresponding software modules that may be stored in RAM, flash memory, ROM, EPROM, EEPROM, registers, hard disk, a removable disk, a compact disk, or any other form of storage medium known in the art. An exemplary storage medium is coupled to the processor such the processor can read information from, and write information to, the storage medium. Of course, the storage medium may also be integral to the processor. The processor and the storage medium may reside in an ASIC. Additionally, the ASIC may reside in a core network interface device. Of course, the processor and the storage medium may reside as discrete components in a core network interface device.

The various modules, units, sub-units or sub-modules may be one or more integrated circuits configured to implement the above methods, such as: one or more Application Specific Integrated Circuits (ASICs), or one or more microprocessors (DSPs), or one or more Field Programmable Gate Arrays (FPGAs), among others. For another example, when some of the above modules are implemented in the form of a Processing element scheduler code, the Processing element may be a general-purpose processor, such as a Central Processing Unit (CPU) or other processor that can call the program code. As another example, these modules may be integrated together and implemented in the form of a system-on-a-chip (SOC).

Those skilled in the art will recognize that in one or more of the examples described above, the functions described in this disclosure may be implemented in hardware, software, firmware, or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer.

The above-mentioned embodiments, objects, technical solutions and advantages of the present disclosure are further described in detail, it should be understood that the above-mentioned embodiments are only examples of the present disclosure, and are not intended to limit the scope of the present disclosure, and any modifications, equivalent substitutions, improvements and the like made on the basis of the technical solutions of the present disclosure should be included in the scope of the present disclosure.

As will be appreciated by one of skill in the art, embodiments of the present disclosure may be provided as a method, system, or computer program product.

Accordingly, embodiments of the present disclosure may take the form of an entirely hardware embodiment, an entirely software embodiment or an embodiment combining software and hardware aspects. Furthermore, the disclosed embodiments may take the form of a computer program product embodied on one or more computer-usable storage media (including, but not limited to, disk storage, CD-ROM, optical storage, and so forth) having computer-usable program code embodied therein.

Embodiments of the present disclosure are described with reference to flowchart illustrations and/or block diagrams of methods, apparatus (systems), and computer program products according to embodiments of the disclosure. It will be understood that each flow and/or block of the flowchart illustrations and/or block diagrams, and combinations of flows and/or blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart flow or flows and/or block diagram block or blocks.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

It will be apparent to those skilled in the art that various changes and modifications can be made in the embodiments of the disclosure without departing from the spirit and scope of the disclosure. Thus, if such modifications and variations of the embodiments of the present disclosure are within the scope of the claims of the present disclosure and their equivalents, the present disclosure is also intended to encompass such modifications and variations.

What is claimed is:

1. A method for determining a hybrid automatic repeat request acknowledgement (HARQ-ACK) feedback time sequence, applied to a terminal and comprising:
   receiving first Downlink Control Information (DCI), wherein the first DCI is used for scheduling Physical Downlink Shared Channels (PDSCHs) transmissions on a plurality of carriers; and
   determining a time unit for transmitting HARQ-ACKs of the PDSCHs on the plurality of carriers scheduled by the first DCI, according to a reference Sub-Carrier Spacing (SCS) or a PDSCH with a latest ending position among the PDSCHs on the plurality of carriers scheduled by the first DCI.

2. The method according to claim 1, wherein the determining the time unit for transmitting the HARQ-ACKs of the PDSCHs on the plurality of carriers scheduled by the first DCI according to the PDSCH with the latest ending position among the PDSCHs on the plurality of carriers scheduled by the first DCI comprises:
   based on a time unit defined by an SCS for transmitting a Physical Uplink Control Channel (PUCCH), determining a latest time unit overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted; and
   taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK;
   or
   the determining the time unit for transmitting the HARQ-ACKs of the PDSCHs on the plurality of carriers scheduled by the first DCI according to the reference SCS comprises:
   determining a reference slot of each PDSCH of the PDSCHs on the plurality of carriers scheduled by the first DCI, wherein the reference slot comprises: a last slot overlapped with the PDSCH or a last slot overlapped with a slot in which the PDSCH is located, the reference slot is defined based on the reference SCS;
   taking a latest reference slot within the reference slots as a first reference slot, and determining a latest time unit overlapped with the first reference slot according to time unit defined by an SCS for transmitting a PUCCH;
   taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

3. The method according to claim 2, wherein the feedback timing value of PDSCH to HARQ-ACK is indicated by the first DCI or configured by a high-layer signaling.

4. The method according to claim 1, wherein the reference SCS comprises any one of:
   an SCS of a carrier where the first DCI is transmitted;
   a maximum SCS among SCSs of the scheduled a plurality of carriers;
   a minimum SCS among SCSs of the scheduled a plurality of carriers; or
   an SCS of a carrier for transmitting a PUCCH;
   and/or
   the time unit is a predefined length of plurality of symbol or a slot or a sub-slot.

5. The method according to claim 1, wherein determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
   the terminal is configured to use a dynamic HARQ-ACK codebook for transmission;
   the plurality of carriers have a same subcarrier spacing;
   the plurality of carriers have a same PDSCH processing capability;
   there is no offset among slot or sub-slot index in the plurality of carriers.

6. A method for determining a hybrid automatic repeat request acknowledgement (HARQ-ACK) feedback time sequence, applied to a network device and comprising:
- sending first Downlink Control Information (DCI), wherein the first DCI is used for scheduling Physical Downlink Shared Channels (PDSCHs) transmissions on a plurality of carriers; and
- determining a time unit for transmitting HARQ-ACKs of the PDSCHs on the plurality of carriers scheduled by the first DCI, according to a reference Sub-Carrier Spacing (SCS) or a PDSCH with a latest ending position among the PDSCHs on the plurality of carriers scheduled by the first DCI.

7. The method according to claim 6, wherein the determining the time unit for transmitting the HARQ-ACKs of the PDSCHs on the plurality of carriers scheduled by the first DCI according to the PDSCH with the latest ending position among the PDSCHs on the plurality of carriers scheduled by the first DCI comprises:
- based on a time unit defined by an SCS for transmitting a Physical Uplink Control Channel (PUCCH), determining a latest time unit overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted; and
- taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK;

or the determining the time unit for transmitting the HARQ-ACKs of the PDSCHs on the plurality of carriers scheduled by the first DCI according to the reference SCS comprises:
- determining a reference slot of each PDSCH of the PDSCHs on the plurality of carriers scheduled by the first DCI, wherein the reference slot comprises: a last slot overlapped with the PDSCH or a last slot overlapped with a slot in which the PDSCH is located, the reference slot is defined based on the reference SCS;
- taking a latest reference slot within the reference slots as a first reference slot, and determining a latest time unit overlapped with the first reference slot according to time unit defined by an SCS for transmitting a PUCCH;
- taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

8. The method according to claim 7, wherein the feedback timing value of PDSCH to HARQ-ACK is indicated by the first DCI or configured by a high-layer signaling.

9. The method according to claim 6, wherein the reference SCS comprises any one of:
- an SCS of a carrier where the first DCI is transmitted;
- a maximum SCS among SCSs of the scheduled a plurality of carriers;
- a minimum SCS among SCSs of the scheduled a plurality of carriers; or
- an SCS of a carrier for transmitting a PUCCH;

and/or the time unit is a predefined length of plurality of symbol or a slot or a sub-slot.

10. The method according to claim 6, wherein the determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
- the terminal is configured to use a dynamic HARQ-ACK codebook for transmission;
- the plurality of carriers have a same subcarrier spacing;
- the plurality of carriers have a same PDSCH processing capability;
- there is no offset among slot or sub-slot index in the plurality of carriers.

11. A terminal, comprising: a first transceiver and a first processor; wherein
- the first transceiver sends and receives data under a control of the first processor;
- the first processor reads a program in a memory to perform:
- receiving first Downlink Control Information (DCI), wherein the first DCI is used for scheduling Physical Downlink Shared Channels (PDSCHs) transmissions on a plurality of carriers; and
- determining a time unit for transmitting HARQ-ACKs of the PDSCHs on the plurality of carriers scheduled by the first DCI, according to a reference Sub-Carrier Spacing (SCS) or a PDSCH with a latest ending position among the PDSCHs on the plurality of carriers scheduled by the first DCI.

12. A network device, comprising: a second transceiver and a second processor; wherein
- the second transceiver sends and receives data under a control of the second processor;
- the second processor reads a program in the memory to perform the method for determining a HARQ-ACK feedback time sequence according to claim 6.

13. The terminal according to claim 11, wherein the first processor reads the program in the memory to perform:
- based on a time unit defined by an SCS for transmitting a Physical Uplink Control Channel (PUCCH), determining a latest time unit overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted; and
- taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK;

or the first processor reads the program in the memory to perform:
- determining a reference slot of each PDSCH of the PDSCHs on the plurality of carriers scheduled by the first DCI, wherein the reference slot comprises: a last slot overlapped with the PDSCH or a last slot overlapped with a slot in which the PDSCH is located, the reference slot is defined based on the reference SCS;

taking a latest reference slot within the reference slots as a first reference slot, and determining a latest time unit overlapped with the first reference slot according to time unit defined by an SCS for transmitting a PUCCH;

taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

14. The terminal according to claim 13, wherein the feedback timing value of PDSCH to HARQ-ACK is indicated by the first DCI or configured by a high-layer signaling.

15. The terminal according to claim 11, wherein the reference SCS comprises any one of:
an SCS of a carrier where the first DCI is transmitted;
a maximum SCS among SCSs of the scheduled a plurality of carriers;
a minimum SCS among SCSs of the scheduled a plurality of carriers; or
an SCS of a carrier for transmitting a PUCCH;
and/or
the time unit is a predefined length of plurality of symbol or a slot or a sub-slot.

16. The terminal according to claim 11, wherein the first processor reads the program in the memory to perform: determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
the terminal is configured to use a dynamic HARQ-ACK codebook for transmission;
the plurality of carriers have a same subcarrier spacing;
the plurality of carriers have a same PDSCH processing capability;
there is no offset among slot or sub-slot index in the plurality of carriers.

17. The network device according to claim 12, wherein the second processor reads the program in the memory to perform:
based on a time unit defined by an SCS for transmitting a Physical Uplink Control Channel (PUCCH), determining a latest time unit overlapped with the PDSCH with the latest ending position among the PDSCHs on the plurality of carriers scheduled by the first DCI, or determining a latest time unit overlapped with a slot where the PDSCH with the latest ending position among the PDSCHs on the plurality of carriers scheduled by the first DCI is transmitted; and
taking the determined latest time unit as a reference point for a feedback timing of PDSCH to HARQ-ACK, and determining the time unit for transmitting the HARQ-ACKs of the PDSCHs on the plurality of carriers scheduled by the first DCI, according to a feedback timing value of PDSCH to HARQ-ACK;
or
the second processor reads the program in the memory to perform:
determining a reference slot of each PDSCH of the PDSCHs on the plurality of carriers scheduled by the first DCI, wherein the reference slot comprises: a last slot overlapped with the PDSCH or a last slot overlapped with a slot in which the PDSCH is located, the reference slot is defined based on the reference SCS;
taking a latest reference slot within the reference slots as a first reference slot, and determining a latest time unit overlapped with the first reference slot according to time unit defined by an SCS for transmitting a PUCCH;
taking the determined time unit as a reference point for the feedback timing of PDSCH to HARQ-ACK, and determining the time unit for transmitting the HARQ-ACKs of the PDSCHs on the plurality of carriers scheduled by the first DCI, based on a feedback timing value of PDSCH to HARQ-ACK.

18. The network device according to claim 17, wherein the feedback timing value of PDSCH to HARQ-ACK is indicated by the first DCI or configured by a high-layer signaling.

19. The network device according to claim 12, wherein the reference SCS comprises any one of:
an SCS of a carrier where the first DCI is transmitted;
a maximum SCS among SCSs of the scheduled a plurality of carriers;
a minimum SCS among SCSs of the scheduled a plurality of carriers; or
an SCS of a carrier for transmitting a PUCCH;
and/or
the time unit is a predefined length of plurality of symbol or a slot or a sub-slot.

20. The network device according to claim 12, wherein the second processor reads the program in the memory to perform: determining the time unit for transmitting the HARQ-ACKs of the PDSCHs on the plurality of carriers scheduled by the first DCI according to the reference SCS or the PDSCH with the latest ending position among the PDSCHs on the plurality of carriers scheduled by the first DCI when at least one of the following conditions is met:
the terminal is configured to use a dynamic HARQ-ACK codebook for transmission;
the plurality of carriers have a same subcarrier spacing;
the plurality of carriers have a same PDSCH processing capability;
there is no offset among slot or sub-slot index in the plurality of carriers.

* * * * *